United States Patent
Berliner et al.

(10) Patent No.: US 12,445,186 B2
(45) Date of Patent: Oct. 14, 2025

(54) SYNCHRONIZATION SIGNAL BLOCK (SSB) SPATIAL OVERLOADING

(71) Applicant: QUALCOMM Incorporated, San Diego, CA (US)

(72) Inventors: Ran Berliner, Kfar-Aviv (IL); Michael Levitsky, Rehovot (IL); Assaf Touboul, Netanya (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/997,214

(22) PCT Filed: May 6, 2021

(86) PCT No.: PCT/US2021/031145
§ 371 (c)(1),
(2) Date: Oct. 26, 2022

(87) PCT Pub. No.: WO2021/226371
PCT Pub. Date: Nov. 11, 2021

(65) Prior Publication Data
US 2023/0189175 A1    Jun. 15, 2023

(30) Foreign Application Priority Data

May 6, 2020   (IL) .......................................... 274510

(51) Int. Cl.
*H04W 56/00* (2009.01)
*H04W 74/0833* (2024.01)

(52) U.S. Cl.
CPC ... *H04W 56/0015* (2013.01); *H04W 74/0833* (2013.01)

(58) Field of Classification Search
CPC .......... H04W 56/0015; H04W 74/0833; H04L 1/1822; H04L 27/2613; H04L 1/08; H04B 7/0695
See application file for complete search history.

(56) References Cited

U.S. PATENT DOCUMENTS

| | | | |
|---|---|---|---|
| 2018/0035396 A1* | 2/2018 | Stirling-Gallacher | ...................... H04W 56/0005 |
| 2018/0234156 A1* | 8/2018 | Tsai | ...................... H04B 7/0686 |
| 2020/0137806 A1 | 4/2020 | Islam et al. | |

FOREIGN PATENT DOCUMENTS

| | | |
|---|---|---|
| CN | 108809602 A | 11/2018 |
| CN | 109803435 A | 5/2019 |
| KR | 20170121705 A | 11/2017 |

OTHER PUBLICATIONS

Huawei, et al., "Synchronization Signal Design in NR", 3GPP TSG RAN WG1 Meeting #86bis, R1-1608846 (Oct. 10-14, 2016). (Year: 2016).*

(Continued)

*Primary Examiner* — Shawn D Miller
(74) *Attorney, Agent, or Firm* — Norton Rose Fulbright US LLP

(57) ABSTRACT

A method of wireless communication includes transmitting, by a wireless communication device, a first Synchronization Signal Block (SSB) transmission during a first slot. The method further includes transmitting, by the wireless communication device, at least a second SSB transmission during the first slot, the second and all other optional SSB transmissions on the first slot carry the same data as the first SSB transmission. The SSB transmissions are transmitted using spatially separated beams. Other aspects and features are also claimed and described.

30 Claims, 10 Drawing Sheets

(56) References Cited

OTHER PUBLICATIONS

Huawei, et al., "Synchronization Signal Design in NR", 3GPP TSG RAN WG1 Meeting #86bis, 3GPP Draft, R1-1608846, 3GPP TSG RAN WG1 Meeting #86bis, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10-Oct. 14, 2016, pp. 1-5, Oct. 9, 2016 (Oct. 9, 2016), XP051148900, p. 2, paragraph 8, table 1.
International Search Report and Written Opinion—PCT/US2021/031145—ISA/EPO—Sep. 3, 2021 (200063WO).
Huawei., et al., "Synchronization Signal Design in NR", 3GPP TSG RAN WG1 Meeting #86bis, R1-1608846, Lisbon, Portugal, Oct. 10-14, 2016, pp. 1-5.

* cited by examiner

SYNCHRONIZATION SIGNAL BLOCK (SSB) SPATIAL OVERLOADING

CROSS-REFERENCE TO RELATED APPLICATIONS

This application claims the benefit of Israel Patent Application No. 274510, entitled, "SYNCHRONIZATION SIGNAL BLOCK (SSB) OVERLOADING," filed on May 6, 2020, which is expressly incorporated by reference herein in its entirety.

TECHNICAL FIELD

Aspects of the present disclosure relate generally to wireless communication systems, and more particularly, to Random Access Channel (RACH) and Synchronization Signal Block (SSB) procedures. Certain embodiments of the technology discussed below can enable and provide SSB overloading.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, and apparatuses that support enhanced SSB procedures, including transmitting partially concurrently and spatially separate SSB transmissions. For example, a base station (e.g., gNB) may transmit two (or more) identical SSB transmissions on the same resources via different beams in different directions. A user equipment (UE) may receive one or more of the SSB transmissions and may respond during a corresponding RACH occasion. By transmitting multiple SSB transmissions at the same time and on the same resources, and also assigning a shared RACH occasion resources for all these SSB transmissions in some embodiments, the overhead consumed by the SSB and RACH process may be reduced. Additionally, or alternatively, the base station may utilize more beams than supported by a receiving device or standard to increase signal strength and signal to noise ratio (such as by more accurate and/or finer beams). Accordingly, such techniques may increase reliability and throughput.

In one aspect, a method of wireless communication includes transmitting, by a wireless communication device, a first SSB transmission during a first slot. The method further includes transmitting, by the wireless communication device, a second SSB transmission during the first slot, the second SSB transmission the same as the first SSB transmission, wherein the first and the second SSB transmissions are transmitted using spatially separated beams.

In another aspect, an apparatus configured for wireless communication includes means for transmitting a first SSB transmission during a first slot; and means for transmitting a second SSB transmission during the first slot, the second SSB transmission the same as the first SSB transmission, wherein the first and the second SSB transmissions are transmitted using spatially separated beams.

In another aspect, a non-transitory computer-readable medium having program code recorded thereon, where the program code includes program code executable by a computer for causing the computer to transmit a first SSB transmission during a first slot; and program code executable by a computer for causing the computer to transmit a second SSB transmission during the first slot, the second SSB transmission the same as the first SSB transmission, wherein the first and the second SSB transmissions are transmitted using spatially separated beams.

In another aspect, an apparatus configured for wireless communication includes at least one processor and a memory coupled to the processor. The processor is configured: to transmit a first SSB transmission during a first slot; and to transmit a second SSB transmission during the first slot, the second SSB transmission the same as the first SSB transmission, wherein the first and the second SSB transmissions are transmitted using spatially separated beams.

In an additional aspect, a method of wireless communication includes monitoring, by a wireless communication device, for a SSB transmission of a plurality of spatially separate SSB transmissions; and receiving, by the wireless communication device, a first SSB transmission of the plurality of spatially separate SSB transmissions, wherein the first and the second SSB transmissions are received using spatially separated beams.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
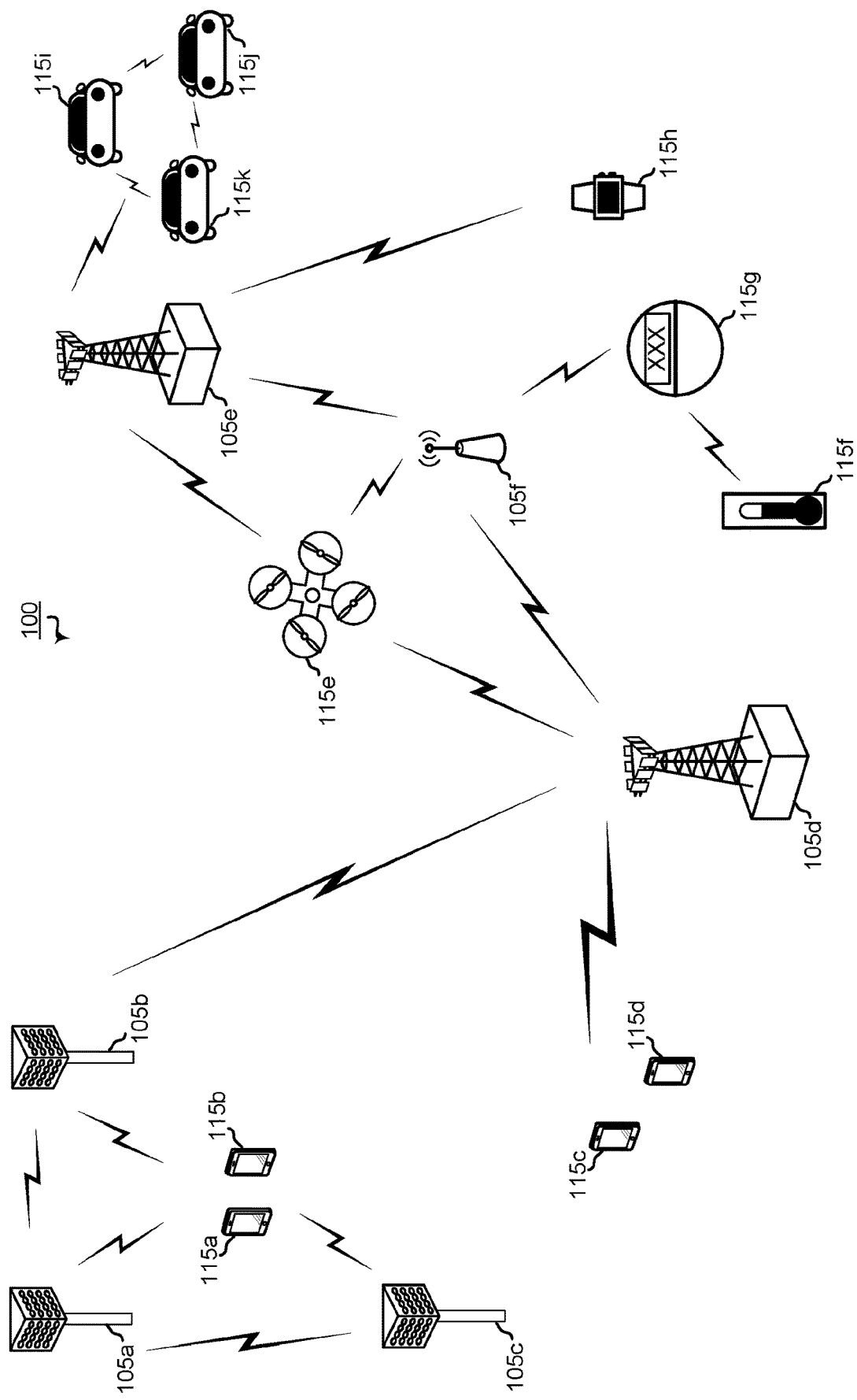
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure is related to beam management operations for wireless communications. Conventionally, SSB and RACH operations may be used to determine and update beams used to transmit and/or receive data. For example, a host node (e.g., base station) may periodically sweep SSB transmissions often referred to as a SSB burst set. The nodes (e.g., UEs) monitor the SSB transmissions to determine network settings and/or beam settings. The UE may determine a high performing SSB, and accordingly a high performing downlink beam to be used by the host node to communicate with the UE. The UE may indicate such preferred beam by responding in the RACH occasion corresponding to a particular SSB transmission. However, when performing such conventional beam management, a large portion of the bandwidth is dedicated to managing beams. For example, in some 5G implementations 64 beams are planned; and thus to transmit a SSB for each beam and to have a corresponding RACH occasion for each SSB, 128 slots are used for beam management. This process is often repeated every 20 milliseconds and the narrow beam nature of 5G and mobile environment may dictate even shorter periods. Thus, a large portion of bandwidth is dedicated to beam management.

The described techniques relate to improved methods, systems, devices, and apparatuses that support the use of spatially separated SSB transmission. Spatially separated SSB transmissions or spatial overloading of SSB transmissions (also referred to herein as spatially separate SSBs) are multiple SSB transmissions carrying the same data that are transmitted at one time and on the same resources via different spatially separated beams. The SSB transmissions may be partially overlapping or fully overlapping. As an example, a base station (e.g., gNB) may transmit two (or more) SSB transmissions via different beams in different directions at the same time and on the same resources. A particular user equipment (UE) may receive one or more of the SSB transmissions transmitted via some beams (spatial directions) and may respond during a corresponding RACH occasion. Additionally, one or more other UEs in other locations may receive the one or more of the SSB transmissions transmitted on a different beams (spatial directions) and may respond during a corresponding RACH occasion. By transmitting multiple SSB transmissions at the same time and on the same resources, and also assuming a shared RACH occasion resources for all these SSB transmissions in some embodiments a bandwidth consumed by the SSB and RACH process may be reduced. Additionally, or alternatively, the base station may utilize more SSB beams than supported by a receiving device or a 5G standard to increase signal strength and to increase a signal-to-noise (SNR) ratio and cell coverage correspondingly. For example, utilizing more beams may enable using more accurate and/or finer beams for SSB transmissions and RACH receptions specifically and also for downlink communications (e.g., downlink communications) in general. Accordingly, such techniques may increase cell coverage, reliability and throughput.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
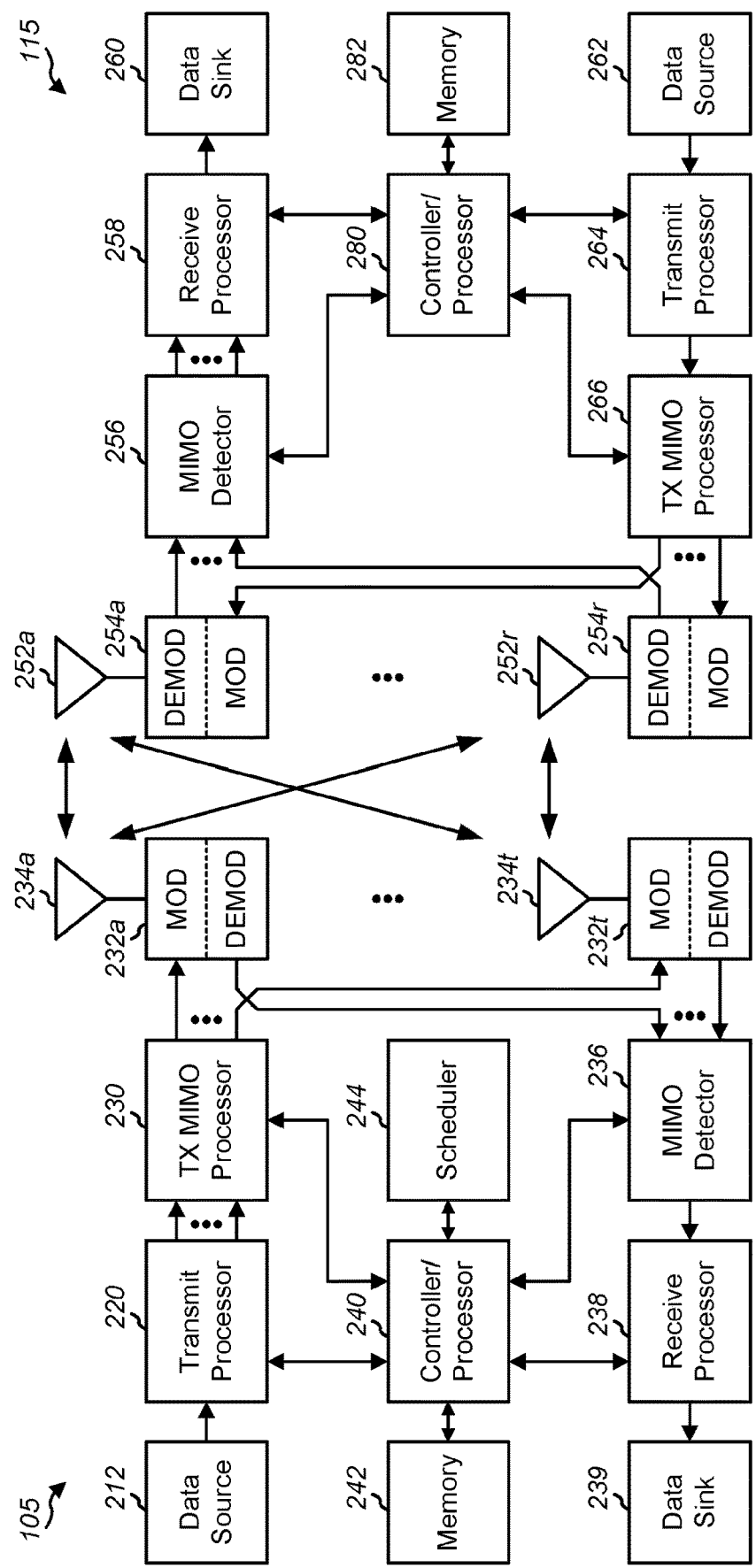
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
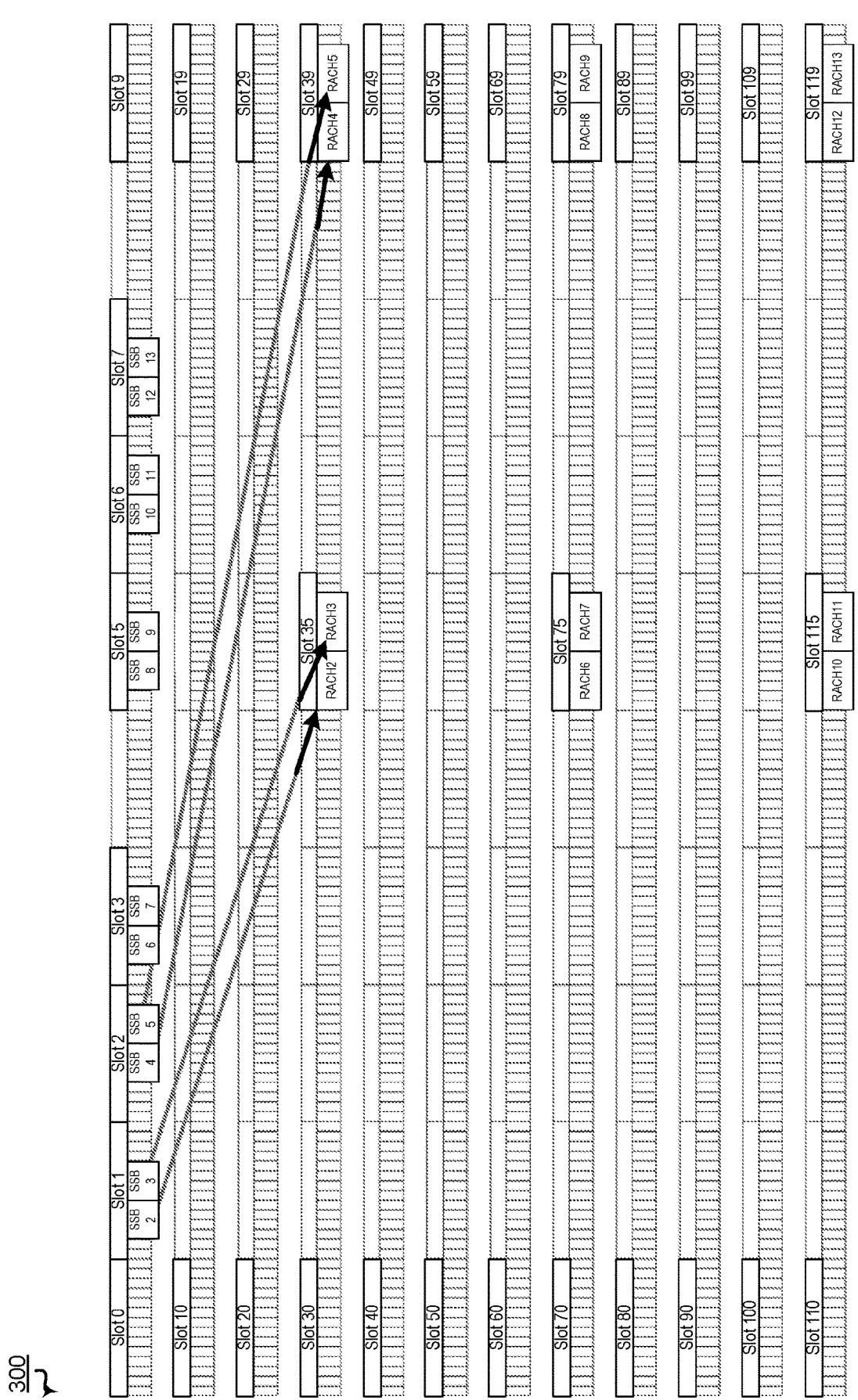
FIG. 3 is a timing diagram of an example of SSB transmission and RACH occasions.

FIG. 3 illustrates an example conventional timing diagram 300 for SSB transmissions and corresponding RACH occasions. Referring to FIG. 3, the timing diagram 300 illustrates 12 SSB transmissions and 12 corresponding RACH occasions occurring over 120 slots. In FIG. 3, each SSB transmission (e.g., SSB2-SSB15) has a corresponding RACH occasion (e.g., RACH2-RACH15). Additionally, each SSB transmission and each RACH occasion have time diversity, i.e., they do not overlap and take place in different slots or different subslots of the same slot. As illustrated in the example of FIG. 3, a first and second SSB are transmitted during a second slot 310 (i.e., slot 1), a third and fourth SSB are transmitted during a third slot (i.e., slot 2), a fifth and sixth SSB are transmitted during a fourth slot (i.e., slot 3), a seventh and eighth SSB are transmitted during a sixth slot (i.e., slot 5), a ninth and tenth SSB are transmitted during a seventh slot (i.e., slot 6), and an eleventh and twelfth SSB are transmitted during an eighth slot (i.e., slot 7).

The SSB transmissions have corresponding RACH occasions in subsequent slots, some of which are indicated in FIG. 3 by lines. The first SSB transmission (SSB2) is associated with/corresponds with a first RACH occasion (RACH2), the second SSB transmission (SSB3) is associated with/corresponds with a second RACH occasion (RACH3), and so on. As illustrated in the example of FIG. 3, the first and second RACH occasion occur during a thirty-sixth slot (i.e., slot 35), a third and fourth RACH occasion occur during a fortieth slot (i.e., slot 39), a fifth and sixth RACH occasion occur during a seventy-sixth slot (i.e., slot 75), a seventh and eighth RACH occasion occur during an eightieth slot (i.e., slot 79), a ninth and tenth RACH occasion occur during a one hundred sixteenth slot (i.e., slot 115), and an eleventh and twelfth RACH occasion occur during a one hundred twentieth slot (i.e., slot 119). Thus, in the example in FIG. 4, the SSB sweep takes up six slots and the associated RACH occasions take up six slots for a total overhead of twelve slots. In some example 5G deployments, twelve SSBs are used with a periodicity of 20 milliseconds and a SCS of 120 kHz. However, current 5G standards propose to support up to 64 beams (e.g., 64 SSBs) and beyond). Therefore, such single SSB transmission takes up considerable bandwidth.

Figure 4:
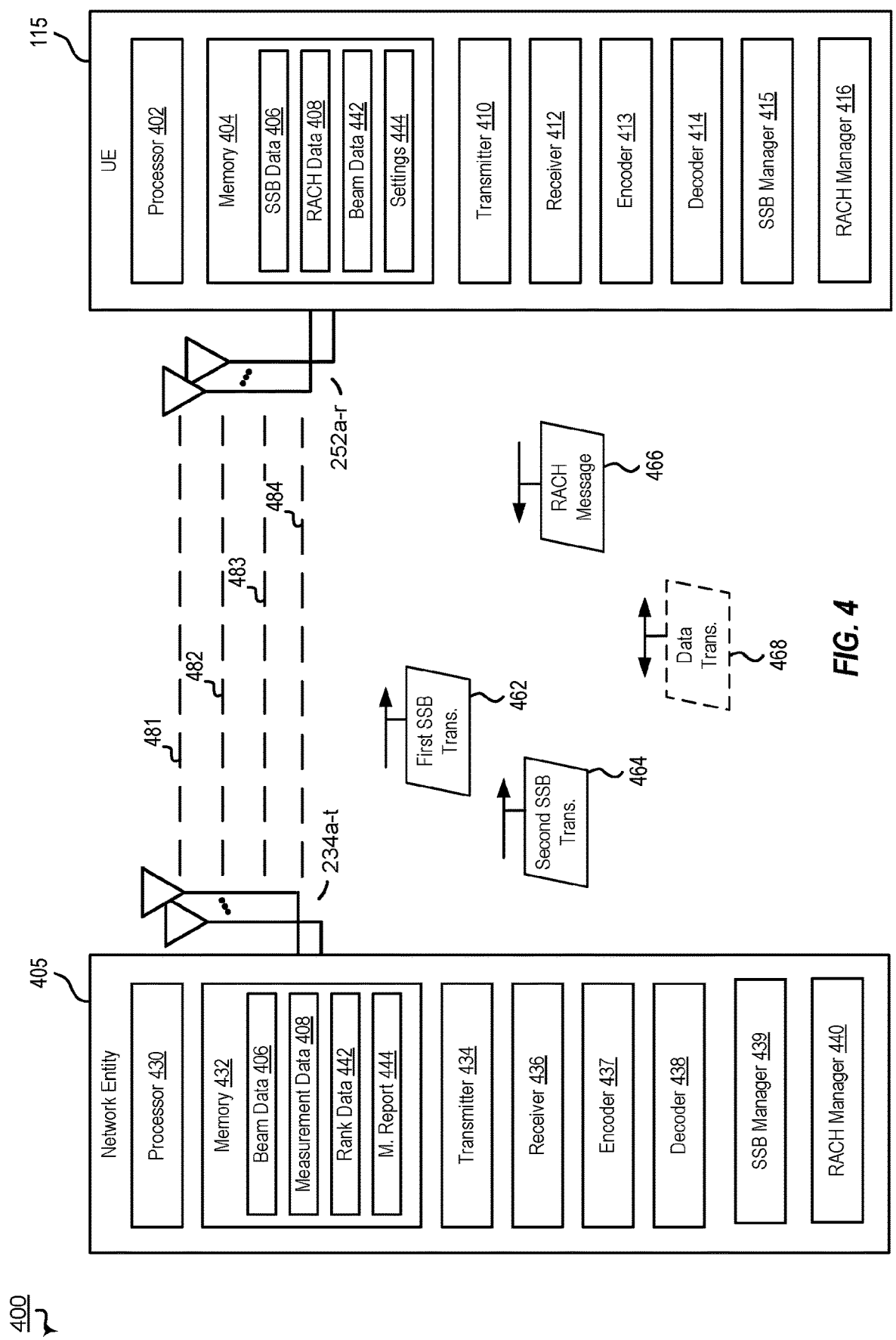
FIG. 4 is a block diagram illustrating an example of a wireless communications system (with a UE and base station) with spatially separated SSB transmissions.

FIG. 4 illustrates an example of a wireless communications system 400 that supports SSB spatial overloading in accordance with aspects of the present disclosure. In some examples, wireless communications system 400 may implement aspects of wireless communication system 100. For example, wireless communications system 400 may include UE 115 and network entity 405. SSB spatial overloading operations may reduce network overhead, and thus may increase throughput and reliability by performing beam management operations with fewer slots.

Network entity 405 and UE 115 may be configured to communicate via frequency bands, such as FR1 having a frequency of 410 to 7125 MHz or FR2 having a frequency of 24250 to 52600 MHz for mm-Wave. It is noted that sub-carrier spacing (SCS) may be equal to 15, 30, 60, or 120 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 405 and UE 115. For example, the control information may be communicated suing MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, SSB manager 415, RACH manager 416 and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store SSB data 406, RACH data 408, beam data 442, settings data 444, or a combination thereof, as further described herein.

The SSB data 406 includes or corresponds to data associated with or corresponding to SSB transmissions. For example, the SSB data 406 may include SSB timing data, SSB index data, measurement data, SSB transmission data, etc. The RACH data 408 includes or corresponds to data associated with or corresponding to RACH occasions and/or RACH occasion transmission (e.g., RACH occasion messages). For example, the RACH data 408 may include RACH occasion timing data, RACH occasion to SSB index/transmission association data, RACH occasion message data, etc.

The beam data 442 includes or corresponds to data associated with one or more beams supported by the wireless communication device and/or network. The beam data 442 may also include to correspond to data associated with uplink beams and/or downlink beams, such as SSB beams and/or RACH occasion message beams. The settings data 444 includes or corresponds to data associated with network settings, standard settings, device settings, etc., or a combination thereof. For example, the settings data 444 may indicate an SSB overload number, a SSB to RACH ratio, a number of beams supported, beam pattern data, etc., or a combination thereof.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. SSB manager 415 may be configured to determine and perform SSB operations. For example, SSB manager 415 is configured to determine SSB settings and/or modes and perform SSB sweeping and/or measurement operations. For example, SSB manager 415 may cause UE 115 to monitor for control signals, such as SSBs. RACH manager 416 may be configured to determine and perform RACH operations. For example, RACH manager 415 is configured to determine RACH settings and/or modes and perform RACH transmission and/or monitoring operations. For example, RACH manager 416 is configured to determine a RACH occasion associated with a SSB transmission and generate a RACH occasion message responsive to a selected SSB transmission.

Network entity 405 includes processor 430, memory 432, transmitter 434, receiver 436, encoder 437, decoder 438, SSB manager 439, RACH manager 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to SSB data 406, RACH data 408, beam data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 405 described with reference to FIG. 2.

Encoder 437, and decoder 438 may include the same functionality as described with reference to encoder 413 and decoder 414, respectively. SSB manager 439 may include similar functionality as described with reference to SSB manager 415. For example, SSB manager 439 is configured to determine, generate, and transmit SSB transmissions. To illustrate, the SSB manager 439 may schedule multiple SSB transmissions at one time, i.e., spatially separated SSBs, that are transmitted via different beams. As another example, RACH manager 440 is configured to determine RACH occasion timing and monitor for RACH occasion messages. To illustrate, the RACH manager 440 may cause the network entity 405 to send monitor for one or more RACH occasion message from the UE 115. In some implementations, the network entity 405 may monitor for RACH occasion using two different beams at the same time.

Network entity 405 may determine to use spatially separate SSBs (e.g., SSB overloading). For example, the network entity 405 may determine to use spatially separate SSBs based on network load, congestion, device mobility, bandwidth allocation, one or more other metrics, or a combination thereof. Additionally, or alternatively, network entity 405 may be set to always use spatially separate SSBs or may be switched to use spatially separate SSBs responsive to manual input.

During operation of wireless communications system 400, devices of wireless communications system 400, establish communication links. For example, UE 115 and network entity 405 perform link establishing operations. To illustrate, UE 115 perform conventional link establishing operations. One such example is the UE 115 listens for SSB bursts from the network entity 405 and requests to join the network entity 405. In some implementations, the SSB burst by the network entity 405 includes spatially separate SSBs.

After the communication links are established, UE 115 and network entity 405 may periodically perform SSB operation to maintain the communication link. To illustrate, network entity 405 may sweep a plurality of SSB transmissions over a plurality of transmission windows (aka transmission slot or slots). As illustrated in the example of FIG. 4, network entity 405 transmits a first SSB transmission 462 and a second SSB transmission 464 at least partially concurrently via two spatially separate beams, such as via two different antenna elements. UE 115 may receive one, both, or none of the SSB transmissions. If the UE 115 receives one or both of the transmissions and the SSB transmissions satisfy a quality metric or are better performing than the other SSB transmissions of the SSB sweep, the UE 115 selects the SSB transmission and determines a corresponding RACH occasion. The UE 115 generates a RACH occasion message 466 and transmits the RACH occasion message 466 during the corresponding RACH occasion, as illustrated and described further with reference to FIGS. 5 and 6.

The network entity 405 monitors the corresponding RACH occasion or occasions (corresponding to the SSB transmissions 462 and 464) and receives the RACH occasion message 466 from the UE 115. In some implementations, a single RACH occasion is associated with both SSB transmissions 462 and 464; and in other implementations, a RACH occasion is associated with each SSB transmission (e.g., 462 and 464) individually.

After receiving the RACH occasion message 466, the network entity 405 selects the particular beam associated with the SSB transmission that corresponds to the RACH occasion where the RACH occasion message 466 was received. The network entity 405 may then transmit data via the particular beam until a time period elapses, the link degrades (e.g., no ACK received), upon establishment of another link with another UE, re-establishment of the link with the UE 115, or upon UE request, as illustrative, non-limiting examples. Accordingly, the network entity 405 may be able to transmit spatially separate SSB transmissions to increase an amount of beams used or reduce overhead (e.g., slots dedicated to SSBs and RACH occasions) as further described with reference to FIGS. 5 and 6.

Thus, FIG. 4 describes enhanced beam management operations for beamforming network operations. Using spatially separate SSBs operations may enable improvement when operating in multiple networks. Performing spatially separate SSBs operations enables a network to improve throughput and reliability.

Figure 5:
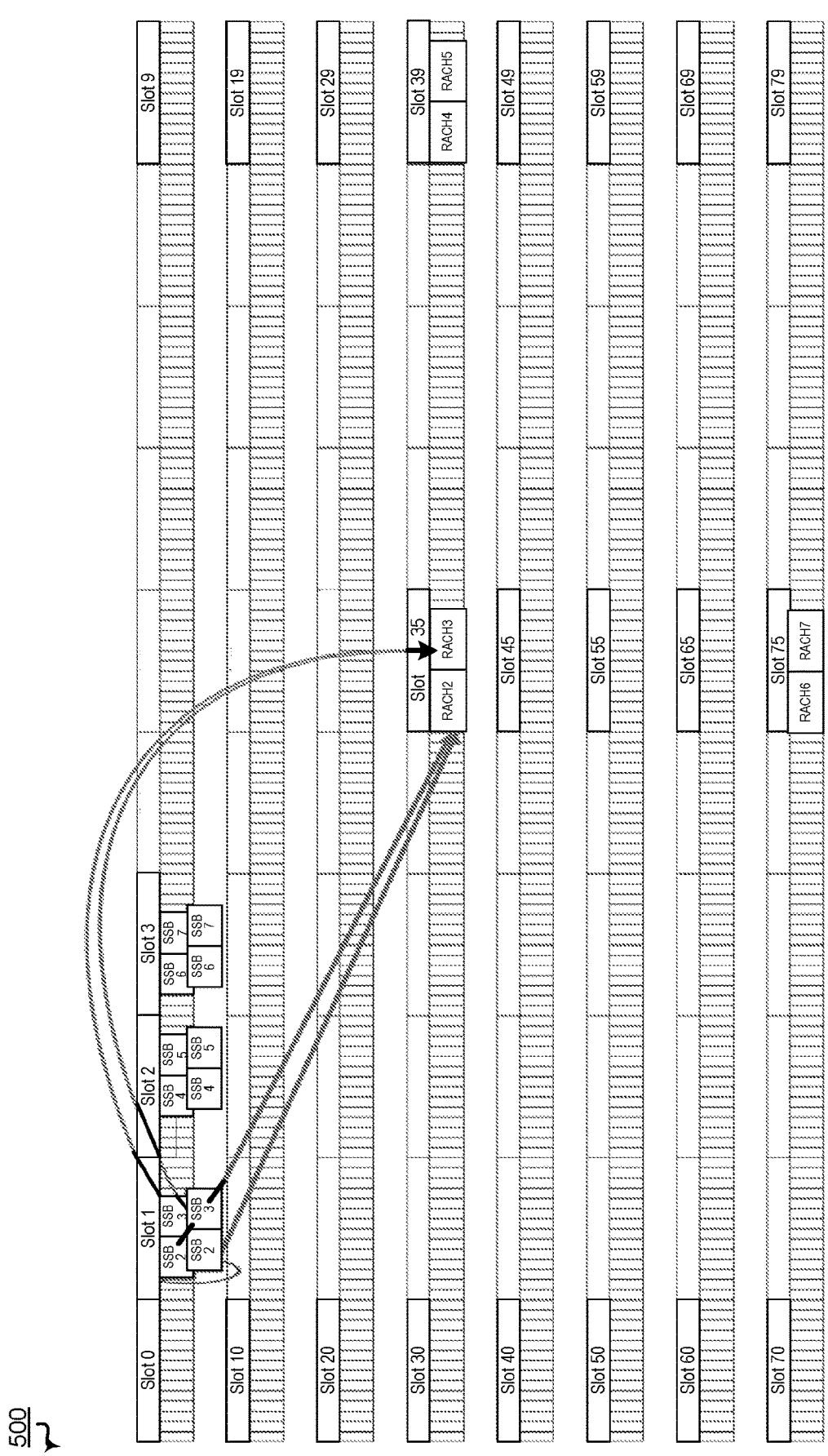
FIG. 5 is a diagram of an example of a timing diagram of spatially separated SSB transmissions and corresponding RACH occasions according to some embodiments of the present disclosure.
Figure 6:
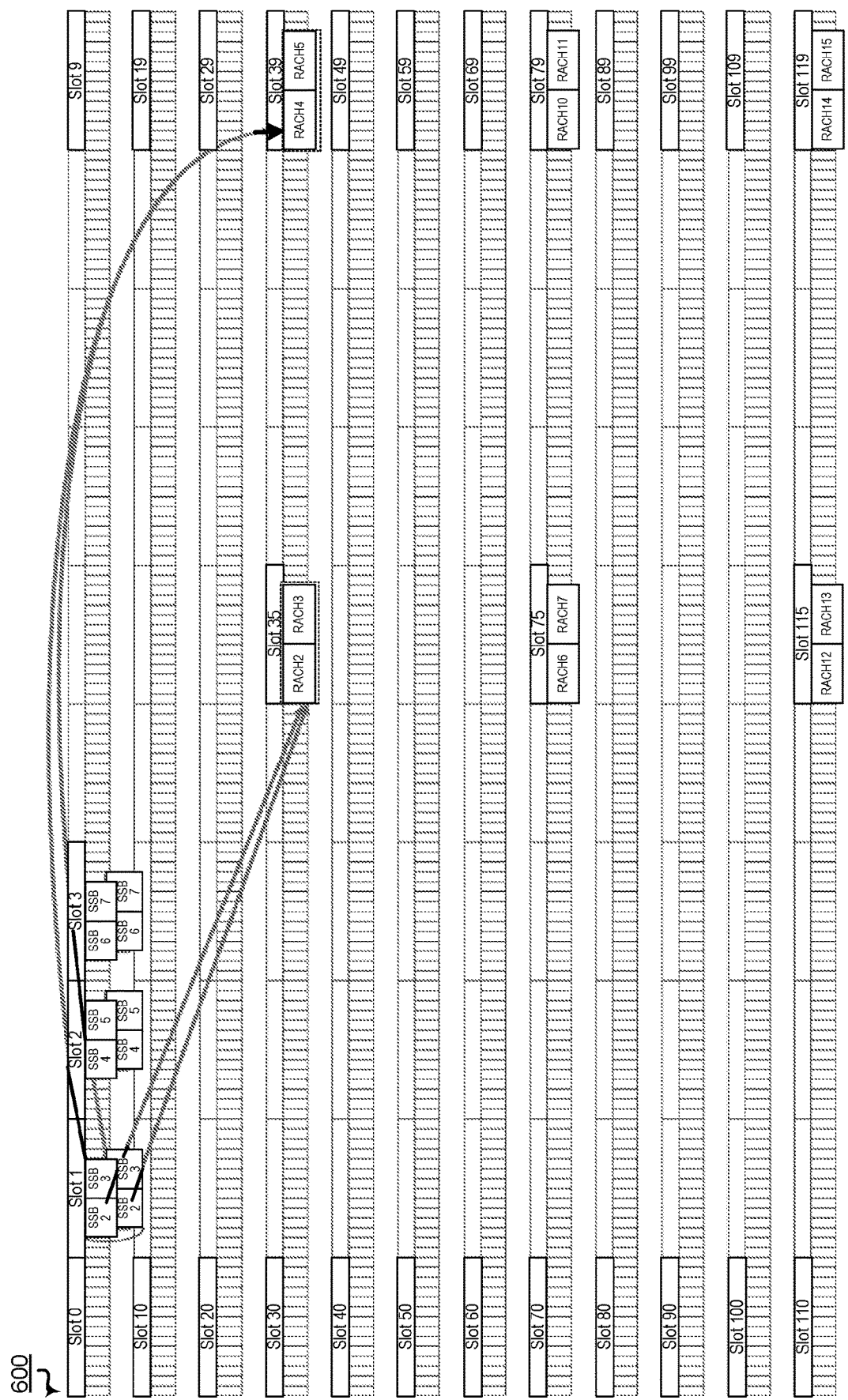
FIG. 6 is a diagram of another example of a timing diagram of spatially separate SSB transmissions and corresponding RACH occasions according to some embodiments of the present disclosure.

FIGS. 5 and 6 illustrate example timing diagrams for overloaded or spatially separated SSB transmissions and corresponding RACH occasions. Referring to FIG. 5, FIG. 5 is an example of a timing diagram 500 with an SSB overloading order of 2 (i.e., 1 RACH occasion for two, or more, SSBs). Said another way, two spatially separated SSBs that are transmitted at least partially concurrently (e.g., simultaneously) are associated with the same RACH occasion (ssb-perRACH-OccasionAndCBPreamblesPerSSB=1). SSB overloading order or factor is the number of SSB beams/SSBs transmitted over the same SSB resources.

In FIG. 5, twelve SSB transmissions (pairs of SSB2-SSB7) are swept (transmitted) over three slots. As illustrated in the example of FIG. 5, a first, second, third, and fourth SSB are transmitted during a second slot (i.e., slot 1), a fifth, sixth, seventh, and eighth SSB are transmitted during a third slot (i.e., slot 2), and a ninth, tenth, eleventh, and twelfth SSB are transmitted during a fourth slot (i.e., slot 3). Although the SSBs are illustrated as transmitted in sequential slots, in other implementations, one or more of the SSBs may be transmitted in non-sequential slots.

For the twelve SSB transmissions of FIG. 5, six corresponding RACH occasions (RACH2-RACH7) occur during three slots spread over a duration of 76 slots. As illustrated in the example of FIG. 5, a first and second RACH occasion occur during a thirty-sixth slot (i.e., slot 35), a third and fourth RACH occasion occur during a fortieth slot (i.e., slot 39), a fifth and sixth RACH occasion occur during a seventy-sixth slot (i.e., slot 75), a seventh and eighth RACH occasion occur during an eightieth slot (i.e., slot 79), a ninth and tenth RACH occasion occur during a one hundred sixteenth slot (i.e., slot 115), and an eleventh and twelfth RACH occasion occur during a one hundred twentieth slot (i.e., slot 119).

Additionally, the first RACH occasion (RACH2) is associated with both the first and second SSBs (first pair of SSBs with SSB ID of 2, SSB2). The second RACH occasion (RACH3) is associated with both the third and fourth SSBs (second pair of SSBs with SSB ID of 3, SSB3). The third RACH occasion (RACH 4) is associated with both the fifth and sixth SSBs (third pair of SSBs with SSB ID of 4, SSB4). The fourth RACH (RACH5) occasion is associated with both the seventh and eighth SSBs (fourth pair of SSBs with SSB ID of 5, SSB5). The fifth RACH (RACH6) occasion is associated with both the ninth and tenth SSBs (fifth pair of SSBs with SSB ID of 6, SSB6). The sixth RACH (RACH7) occasion is associated with both the eleventh and twelfth SSBs (sixth pair of SSBs with SSB ID of 7, SSB7).

Thus, in the example in FIG. 5, the SSB sweep takes up three slots and the associated RACH occasions take up three slots for a total overhead of six slots. As compared to the timing diagram 300 of FIG. 3, the timing diagram 500 of FIG. 5 uses less slots. In the specific examples, shown, the spatially separate SSB implementation of FIG. 5 uses half the amount of slots of FIG. 3 for a 50 percent reduction in network overhead.

Referring to FIG. 6, FIG. 6 is an example of a timing diagram 600 with an SSB overloading order of 2 per beam (i.e., 2 RACH occasions for each SSB in this case). Said another way, two spatially separated SSB beams are used to transmit the same SSB ID and are transmitted concurrently or at least partially concurrently (e.g., simultaneously) and are associated with the same doubled RACH occasion resource or two RO resources in other words (meaning each SSB ID or SSB resource in this case with SSB overloading order of 2 will be associated with 2 RO resources).

As compared to FIG. 5, the timing diagram 600 has the same overloading order. However, regarding RACH, the timing diagram 600 has a different number of RACH occasions. For example, in case of FIG. 5 scenario, for the receiver side multiple receive beams are assumed to be used simultaneously to receive a RACH occasion message that may come from different UEs/different directions (assuming each UE received a different SSB beam transmitted on the same SSB resources associated with the same shared RACH occasion message resources). In FIG. 6, each one of the SSBs transmitted on the same SSB resource and associated with the same SSB ID will have a doubled RACH occasion resource (e.g. each UE will transmit a RACH message on two corresponding RACH occasion resources) such that a single receive beam at a time may be used on the network side for reception of each one of these RACH occasion resources. Each receive beam by a network device (e.g., base station) will receive one of the UEs RACH message on the corresponding one out of two RACH occasion resources.

In FIG. 6, and with an overloading factor 2, each UE may respond to the SSB transmissions with its RACH message over two RACH occasions (RO resources) associated with the specific SSB ID. A particular UE will transmit twice on both RO resources and the network device can sweep these two resources each time with one of the beams used to transmit this spatially overloaded SSB ID (in this case 2 beams with overloading factor 2). Accordingly, each receive beam by the network may "catch" one of the UEs RACH messages when the UE's receive the SSB ID on the different spatial beams (2 beams in this example). Thus, each spatially overloaded SSB resource has two RO resources when a factor of 0.5 SSB resource per RACH resource is used.

In FIG. 6, twelve SSB transmissions (pairs of SSB2-SSB7) are swept (transmitted) over three slots similar to FIG. 5. However, in the example of FIG. 6, each SSB transmission has a corresponding RACH occasion and the twelve corresponding RACH occasions (RACH2-RACH7 and RACH10-RACH15) occur during six slots spread over a duration of 120 slots. In some implementations, such as illustrated in FIG. 6, the spatially separate SSBs are associated with consecutive RACH occasions (e.g., two consecutive RACH occasions).

As illustrated in the example of FIG. 6, a first and second RACH occasion occur during a thirty-sixth slot (i.e., slot 35), a third and fourth RACH occasion occur during a fortieth slot (i.e., slot 39), a fifth and sixth RACH occasion occur during a seventy-sixth slot (i.e., slot 75), a seventh and eighth RACH occasion occur during an eightieth slot (i.e., slot 79), a ninth and tenth RACH occasion occur during a one hundred sixteenth slot (i.e., slot 115), and an eleventh and twelfth RACH occasion occur during a one hundred twentieth slot (i.e., slot 119).

Additionally, the first and second RACH occasions (RACH2 and RACH3) are associated with both the first and second SSBs (first pair of SSBs with SSB ID of 2, SSB2). The third and fourth RACH occasions (RACH4 and RACH5) are associated with both the third and fourth SSBs (second pair of SSBs with SSB ID of 3, SSB3). The third RACH occasions (RACH6 and RACH7) are associated with both the fifth and sixth SSBs (third pair of SSBs with SSB ID of 4, SSB4). The fifth and sixth RACH occasions (RACH10 and RACH11) are associated with both the seventh and eighth SSBs (fourth pair of SSBs with SSB ID of 5, SSB5). The fifth RACH occasions (RACH12 and RACH13) are associated with both the ninth and tenth SSBs (fifth pair of SSBs with SSB ID of 6, SSB6). The sixth RACH occasions (RACH14 and RACH15) are associated with both the eleventh and twelfth SSBs (sixth pair of SSBs with SSB ID of 7, SSB7).

Thus, in the example in FIG. 6, the SSB sweep takes up three slots and the associated RACH occasions take up six slots for a total overhead of nine slots. As compared to the timing diagram 500 of FIG. 5, the timing diagram 600 of FIG. 6 uses more slots for RACH occasions but does not have the base station to utilize dual simultaneous beams for monitoring during RACH occasions. A particular base station may be set to operate in one mode depending on hardware capabilities or may switch between the modes of FIGS. 3, 5, and/or 6 based on one or more conditions or inputs.

Although twelve SSBs (SSB transmissions) are illustrated in the examples of FIGS. 5 and 6, fewer or more SSBs may be used in other implementations. For example, 64 or 128 SSBs transmissions may be used in some implementations. As another example, more than two SSBs may be transmitted fully or partially concurrently (i.e., an SSB overloading order of greater than two). To illustrate, three, four, or more SSB transmissions may be transmitted at least partially concurrently. Furthermore, although pairs of spatially separate SSBs are illustrated as partially overlapping with each other with respect to subslots/time in FIGS. 5 and 6, in other implementations the pairs of spatially separate SSBs may be sent simultaneously (e.g., fully overlap each other).

Additionally, although some of the benefits of spatially separate SSBs (e.g., SSB overloading) have been described with reference to reduced overhead, in addition to or in the alternative of reducing overhead, spatially separate SSBs may enable a network and device correspondingly to increase coverage, throughput and quality via improved signal-to-noise ratio of SSB, RACH receptions specifically, as well as other types of downlink signals. For example, a network or standard may be designed to use a first number of beams N (e.g., 64). A wireless communication device, such as a gNB, may be capable of using a second number of beams M (e.g., 128). The wireless communication device may use the second number of beams M and transmit multiple (e.g., two) SSB transmissions in each transmission window (e.g., set of subslots) corresponding to multiple (e.g., two) beams of the M number of beams and the receiving device may operate as normal and with no knowledge of the SSB overloading. The receiving device would monitor for a SSB transmission each transmission window as normal and report the best SSB transmission of the SSB sweep during the corresponding RACH occasion, indicative of the best beam. During the RACH occasions, the wireless communication device (e.g., the gNB) would monitor the multiple (e.g., both) beams defined by the beams used to transmit the SSBs associated with the specific RACH occasion. Therefore, the wireless communication device may use more SSB transmissions and more beams and/or finer beams to increase signal quality and thus throughput and/or reliability (finer SSB beams will allow to use a finer TRS beams and PDSCH beams correspondingly in accordance with different QCL related definitions and limitations in the specification). This increase in quality may come without any increase in overhead, i.e., network overhead or bandwidth. To illustrate there can be no increase in slots for SSBs and RACH occasions as compared FIG. 3.

Figure 7:
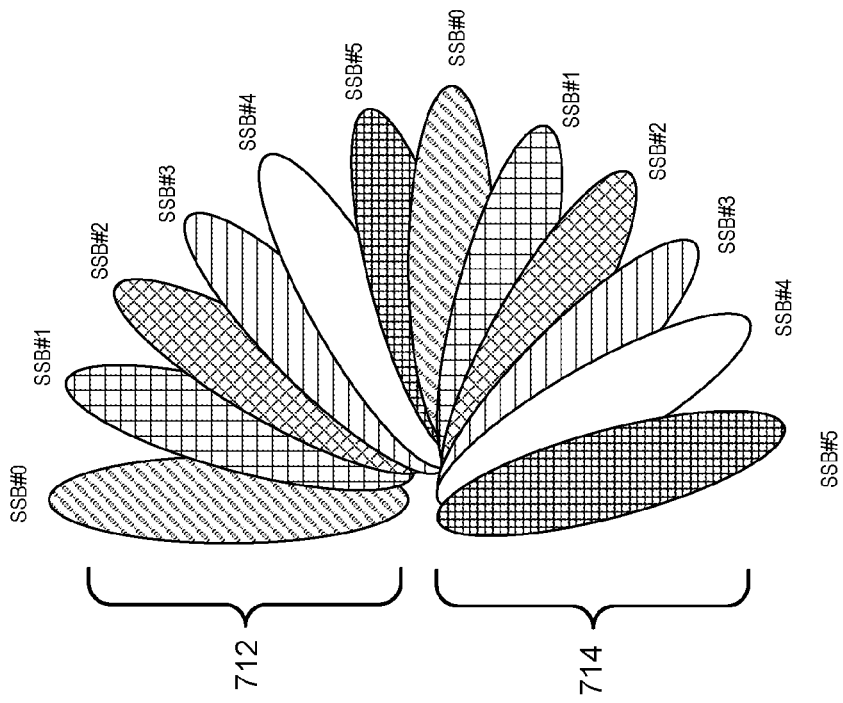
FIG. 7 is a beam diagram of an example of SSB beam groups.

FIG. 7 is an exemplary beam diagram 700 illustrating twelve beams for SSBs. In FIG. 7, the beam diagram 700 has two sets of beams for a given set of SSBs (SSB0-SSB5), that is a first set of beams 712 (e.g., beams 0-5 associated with SSB0-SSB5) and a second set of beams 714 (e.g., beams 6-11 associated with SSB0-SSB5). In the example of FIG. 7, the sets of beams 712, 714 are split into two groups of top and bottom groups with the first set of beams 712 corresponding to the first/top group and the second set of beams 714 corresponding to the second/bottom group. The example of FIG. 7 illustrates a partial illustration of an SSB overloading factor of 4, that is 4 beams at one time or 4 beams over a defined area (e.g., 360 degrees).

In other implementations, the sets of beams 712, 714 may be split into any number of groups and in other ways, such as interleaved, random, pseudorandom, by quadrant, etc., while preserving spatial separation of the grouped beams. Thus, with respect to the examples described above, two beams, one from each set (e.g., beam 0 associated with SSB0 and beam 6 associated with SSB0), would be transmitted at least partially concurrently during a SSB transmission window/interval. Accordingly, a single SSB index (e.g., SSB0) can be transmitted over multiple directions during a time period and on the same SSB resource using multiple beams instead of using a different SSB index and a different SSB resource to represent each one of these directions/beams.

Figures 8, 9:
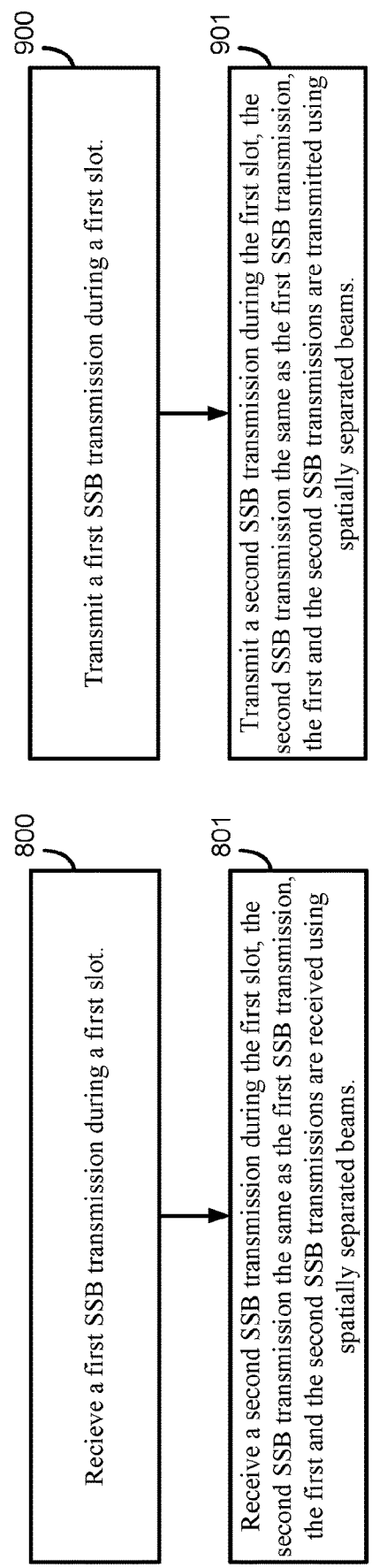
FIG. 8 is a flow diagram illustrating example blocks executed by a UE configured according to an aspect of the present disclosure.
FIG. 9 is a flow diagram illustrating example blocks executed by a base station configured according to an aspect of the present disclosure.
Figure 10:
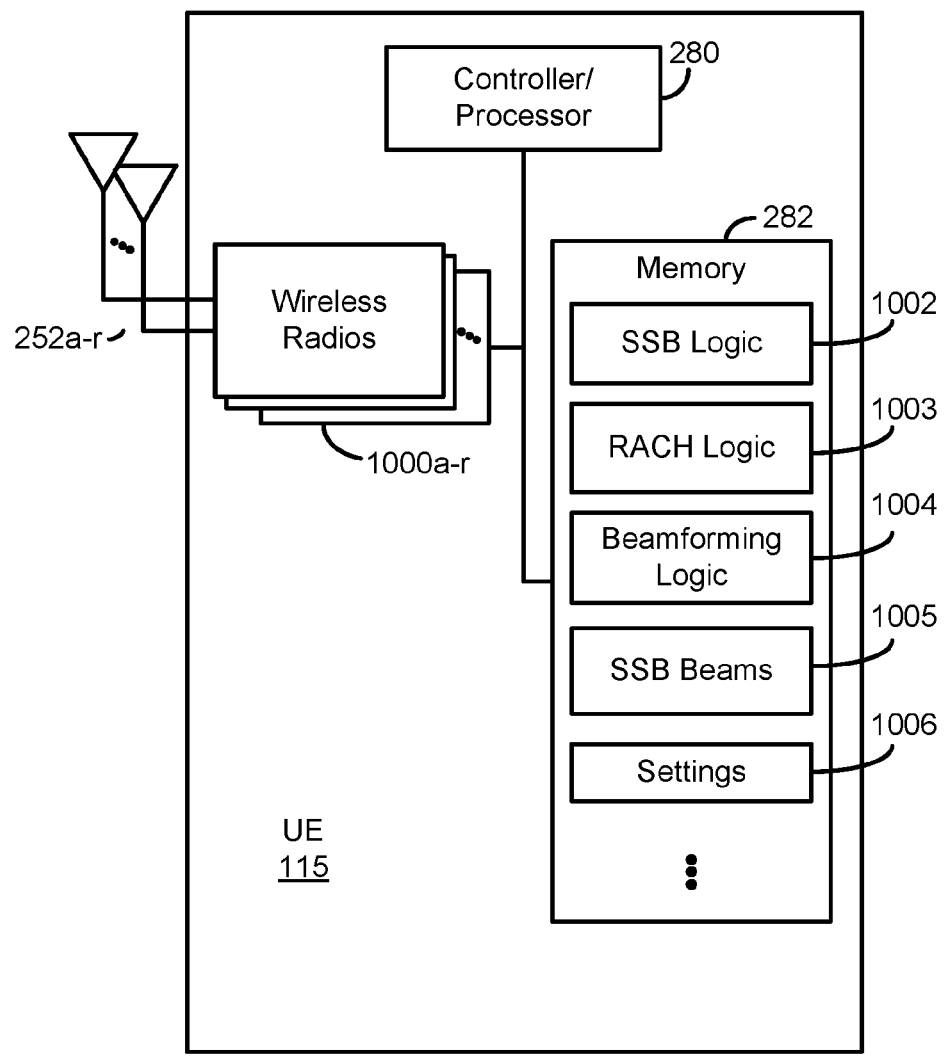
FIG. 10 is a block diagram conceptually illustrating a design of a UE configured to perform spatial SSB overloading operations according to some embodiments of the present disclosure.

FIG. 8 is a flow diagram illustrating example blocks executed by a UE configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000*a-r* and antennas 252*a-r*. Wireless radios 1000*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 10, memory 282 stores SSB logic 1002, RACH logic 1003, beamforming logic 1004, SSB beam data 1005, and settings data 1006.

At block 800, a wireless communication device, such as a UE, receives a first SSB transmission during a first slot. For example, the UE 115 receives a first SSB transmission from a base station, such as base station 105, as described with reference to FIGS. 4-6.

At block 801, the UE 115 receives a second SSB transmission during the first slot, the second SSB transmission the same as the first SSB transmission. The first and the second SSB transmissions are received using spatially separated beams. For example, the UE 115 receives a second SSB transmission, which is the same as and is spatially separate from the first SSB transmission, as described with reference to FIGS. 4-6.

Additionally, or alternatively, another UE may receive the second SSB transmission. For example, the UE 115 may only receive the first SSB transmission and the other UE (second UE) receives the second SSB transmission. The first and second UEs then may transmit RACH message (RO messages) in the corresponding RO resources, as described in FIGS. 4-6. In some implementations, the RACH occasions are the same. In other implementations, the RACH occasions are different (e.g., different part of the slot or different slot).

The UE 115 may execute additional blocks (or the UE 115 may be configured further perform additional operations) in other implementations. For example, the UE 115 may perform one or more operations described above. In some implementations, the UE 115 establishes a communication link with a host node. For example, the UE 115 establishes a communication link with base station 105 by conventional operations. To illustrate, the base station 105 may transmit a SSB burst set and the UE 115 may transmit a request to join. In some implementations, the UE 115 transmits a request to establish a link responsive to a spatially separate SSB burst sweep by the base station 105. As another example, the UE 115 may transmit a RACH occasion message corresponding to the first SSB transmission, as described in FIGS. 5 and 6.

Accordingly, a UE and a base station may perform enhanced SSB operations. By performing enhanced SSB operations, throughput and reliability may be increased.

Figure 11:
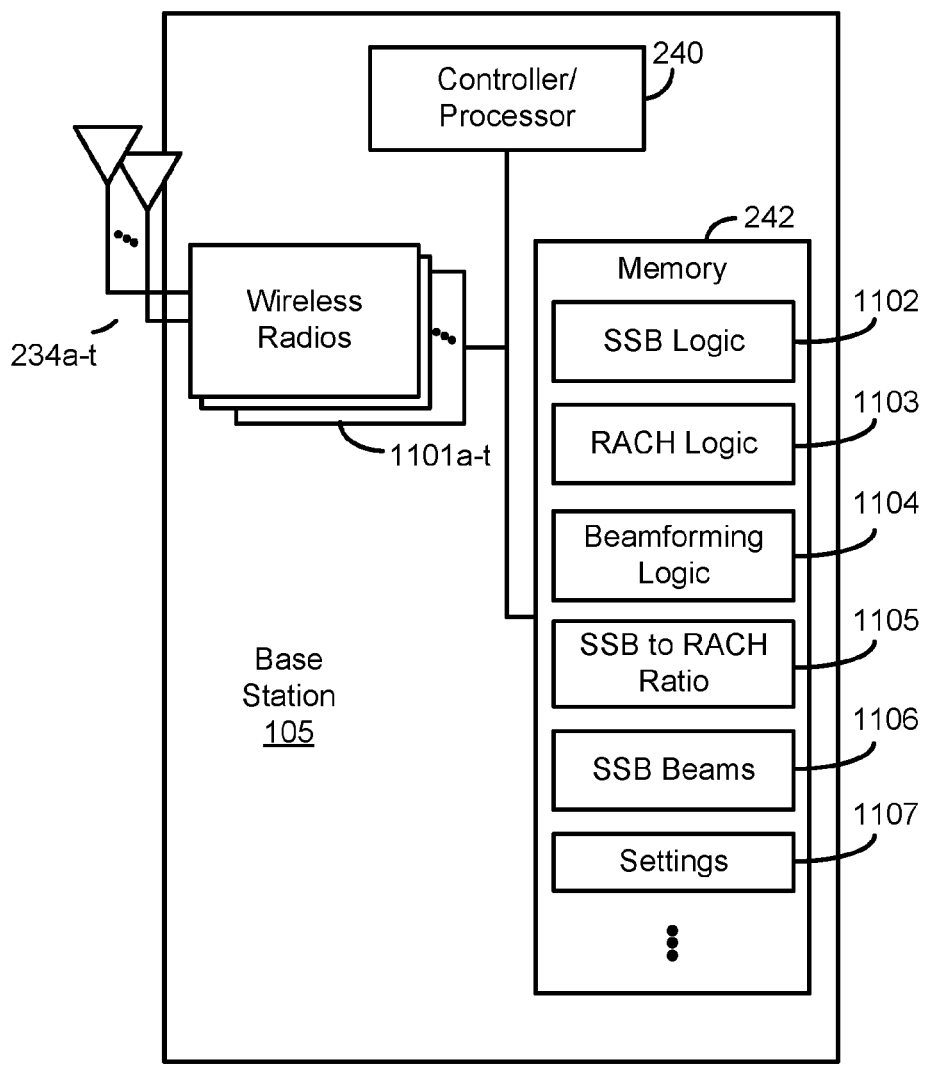
FIG. 11 is a block diagram conceptually illustrating a design of a base station configured to perform spatial SSB overloading operations according to some embodiments of the present disclosure.

FIG. 9 is a flow diagram illustrating example blocks executed by wireless communication device configured according to another aspect of the present disclosure. The example blocks will also be described with respect to base station 105 (e.g., gNB) as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1101*a-t* and antennas 234*a-t*. Wireless radios 1101*a-t* includes various components and hardware, as illustrated in FIG. 2 for base station 105, including modulator/demodulators 232*a-t*, MIMO detector 236, receive processor 238, transmit processor 220, and TX MIMO processor 230. As illustrated in the example of FIG. 11, memory 242 stores SSB logic 1102, RACH logic 1103, beamforming logic 1104, SSB to RACH Ratio data 1105, SSB beam data 1106, and settings data 1107. One of more of 1102-1107 may include or correspond to one of 1002-1006.

At block 900, a wireless communication device, such as a base station, transmits a first SSB transmission during a first slot. For example, the base station 105 transmits a first SSB transmission, as described with reference to FIGS. 4-6.

At block 901, the base station 105 transmits a second SSB transmission during the first slot, and the second SSB transmission is the same as the first SSB transmission. The first and the second SSB transmissions are transmitted using spatially separated beams. For example, the base station 105 transmits a second SSB transmission, as described with reference to FIGS. 4-6. The transmission of the two SSBs at 900 and 901 corresponds to a transmission of spatially separate SSBs.

The base station 105 may execute additional blocks (or the base station 105 may be configured further perform additional operations) in other implementations. For example, the base station 105 may perform one or more operations described above. In a particular implementation, the base station 105 establishes a communication link with a node. For example, base station 105 establishes a communication link with UE 115 by conventional operations. To illustrate, the base station 105 may transmit a SSB burst set and the UE 115 may transmit a request to join. In other implementations, the UE 115 transmits a request to establish a link responsive to receiving one or more SSBs of a spatially separate SSB burst sweep by the base station 105.

As another example, the base station 105 may monitor at least a first corresponding RACH occasion for the first and second SSB transmissions, as described in FIGS. 5 and 6. In some such implementations, the base station 105 may receive a RACH occasion message from the UE 115 for the first SSB transmission during a corresponding RACH occasion, as described in FIGS. 5 and 6. Additionally, or alternatively, the base station 105 may receive a RACH occasion message from the UE 115 for the second SSB transmission during a corresponding RACH occasion, as described in FIGS. 5 and 6.

As another example, the base station 105 may transmit, to the UE 115, data based on using a particular beam corresponding to the second SSB transmission and indicated by the RACH occasion message, as described in FIG. 4. Additionally, or alternatively, the base station 105 may receive, from the UE 115, data based on using a particular beam corresponding to the second SSB transmission and indicated by the RACH occasion message, as described in FIG. 4.

In some implementations, the first and second SSB transmissions are spatially separated. In some such implementations, the first and second SSB transmissions are transmitted partially concurrently. In a particular implementation, the first SSB transmission is transmitted during a first subslot of the first slot, and where the second SSB transmission is transmitted during a second subslot of the first slot.

In some other implementations, the first and second SSB transmissions are transmitted simultaneously. Additionally, or alternatively, the first and second SSB transmissions have the same SSB index, the same digital signal, the same scrambling code, the same timing, the same frequency, or a combination thereof.

As another example, the base station 105 may transmit a third SSB transmission during the first slot, where the first SSB transmission has a first corresponding RACH occasion in a second slot, where the second SSB transmission has a second corresponding RACH occasion in the second slot, and where the second SSB transmission has a third corresponding RACH occasion in the second slot.

In some implementations, when a network is configured for N number of SSBs, the base station may be configured to send M number of SSBs, where M is greater than N. In some implementations, the first and second SSB transmissions are associated with a single corresponding RACH occasion. In some implementations, the first and second SSB transmissions share a corresponding RACH occasion in a second slot, and where the first and second slots are not sequential.

As another example, the base station 105 may transmit a third SSB transmission and a fourth SSB transmission during the first slot, where the first SSB transmission and the second SSB transmission share a first corresponding RACH occasion in a second slot, and where the third SSB transmission and the fourth SSB transmission share a second corresponding RACH occasion in the second slot. In some implementations the first and second slots are not sequential.

As another example, the base station 105 may be configured to monitor multiple beams simultaneously, as described with reference to FIG. 6. To illustrate, the base station 105 may monitor a first RACH occasion using a first beam, and monitor the first RACH occasion using a second beam, the first RACH occasion corresponding to both the first and second SSB transmissions. In some implementations, the first and second SSB transmissions are associated with two corresponding RACH occasions. In some such implementations, the two corresponding RACH occasions are consecutive RACH occasions. In some such implementations, the two corresponding RACH occasions are in a second slot.

As another example, the base station 105 may transmit a third SSB transmission during the first slot, where the first and third SSB transmissions have corresponding RACH occasions in different slots. In some such implementations, the first SSB transmission has a first corresponding RACH occasion in a second slot, where the second SSB transmission has a second corresponding RACH occasion in the second slot, and where the third SSB transmission has a third corresponding RACH occasion in a third slot. In some such implementations, the first, the second, and the third slots are not sequential. In some other implementations, the base station 105 is configured to monitor a single beam, as described with reference to FIG. 6.

As another example, the base station 105 may, prior to transmitting the first SSB transmission, establish a communication link with a node. In some such implementations, the communication link is established by base station 105 sending spatially separate SSBs.

In one or more aspects, techniques for supporting SSB spatial overloading may include additional aspects, such as any single aspect or any combination of aspects described below or in connection with one or more other processes or devices described elsewhere herein. In one or more aspects, supporting SSB spatial overloading may include an apparatus configured to transmit a first Synchronization Signal Block (SSB) transmission during a first slot. The apparatus is further configured to transmit a second SSB transmission during the first slot, the second SSB transmission the same as the first SSB transmission. The first and the second SSB transmissions are transmitted using spatially separated beams. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, the apparatus is further configured to monitor at least a first corresponding Random Access Channel (RACH) occasion associated with the first and the second SSB transmissions using corresponding spatially separated reception beams.

In a second aspect, alone or in combination with the first aspect, the apparatus is further configured to receive a message on Random Access Channel (RACH) occasion resources from a second wireless communication device and associated with the first SSB transmission during a corresponding RACH occasion and using a first reception beam.

In a third aspect, alone or in combination with the second aspect, the apparatus is further configured to receive a message on Random Access Channel (RACH) occasion resources from a third wireless communication device and associated with the second SSB transmission during a corresponding RACH occasion and using a second reception beam.

In a fourth aspect, alone or in combination with the third aspect, the apparatus is further configured to transmit, to the second wireless communication device, data based on using a particular beam corresponding to the second SSB transmission and associated with the corresponding RACH occasion and the message received using the second reception beam.

In a fifth aspect, alone or in combination with one or more of the third aspect through the fourth aspect, the apparatus is further configured to receive, from the second wireless communication device, data based on using a particular beam corresponding to the second SSB transmission and associated with the corresponding RACH occasion and the message received using the second reception beam.

In a sixth aspect, alone or in combination with one or more of the first aspect through the fifth aspect, the first and second SSB transmissions are spatially separated.

In a seventh aspect, alone or in combination with one or more of the first aspect through the sixth aspect, the first and second SSB transmissions are transmitted simultaneously.

In an eighth aspect, alone or in combination with one or more of the first aspect through the seventh aspect, the first and second SSB transmissions have the same SSB index, the same digital signal, the same scrambling code, the same timing, the same frequency, or a combination thereof and are transmitted on the same resources.

In a ninth aspect, alone or in combination with one or more of the first aspect through the eighth aspect, the apparatus is further configured to transmit a third SSB transmission during the first slot. The first SSB transmission and the second SSB transmission have a first corresponding Random Access Channel (RACH) occasion in a second slot. The third SSB transmission has a second corresponding RACH occasion in the second slot.

In a tenth aspect, alone or in combination with one or more of the first aspect through the ninth aspect, the first and second SSB transmissions are associated with a single corresponding Random Access Channel (RACH) occasion.

In an eleventh aspect, alone or in combination with one or more of the first aspect through the tenth aspect, the first and second SSB transmissions share a corresponding Random Access Channel (RACH) occasion in a second slot. The first and second slots are not sequential.

In a twelfth aspect, alone or in combination with one or more of the first aspect through the eleventh aspect, the apparatus is further configured to transmit a third SSB transmission and a fourth SSB transmission during the first slot. The first SSB transmission and the second SSB transmission share a first corresponding Random Access Channel (RACH) occasion in a second slot. The third SSB transmission and the fourth SSB transmission share a second corresponding RACH occasion in the second slot.

In a thirteenth aspect, alone or in combination with the twelfth aspect, the first and second slots are not sequential.

In a fourteenth aspect, alone or in combination with one or more of the first aspect through the thirteenth aspect, the apparatus is further configured to transmit a third SSB transmission during the first slot. The first, the second and the third SSB transmissions have corresponding Random Access Channel (RACH) occasions in different slots.

In a fifteenth aspect, alone or in combination with the fourteenth aspect, the first SSB transmission has a first corresponding RACH occasion in a second slot. The second SSB transmission has a second corresponding RACH occasion in the third slot. The third SSB transmission has a third corresponding RACH occasion in a fourth slot.

In a sixteenth aspect, alone or in combination with the fifteenth aspect, the first, the second, the third and the fourth slots are not sequential.

In a seventeenth aspect, when a network of the wireless communication device is configured for N number of SSBs and the wireless communication device is configured to use M number of SSB beams. M is greater than N.

In an eighteenth aspect, alone or in combination with the seventeenth aspect, the wireless communication device is configured to monitor multiple beams simultaneously, and the apparatus is further configured to monitor a first Random Access Channel (RACH) occasion using a first beam; and monitor the first RACH occasion using a second beam, the first RACH occasion corresponding to both the first and second SSB transmissions.

In a nineteenth aspect, alone or in combination with one or more of the seventeenth aspect through the eighteenth aspect, the first and second SSB transmissions are transmitted at least partially concurrently.

In a twentieth aspect, alone or in combination with the nineteenth aspect, the apparatus is further configured to transmit a third SSB transmission during the first slot. The first second, and third SSB transmissions have a first corresponding Random Access Channel (RACH) occasion in a second slot. The third SSB transmission has a second corresponding RACH occasion in the second slot.

In a twenty-first aspect, alone or in combination with one or more of the seventeenth aspect through the twentieth aspect, the first and second SSB transmissions are associated with two corresponding Random Access Channel (RACH) occasions.

In a twenty-second aspect, alone or in combination with the twenty-first aspect, the two corresponding RACH occasions are consecutive RACH occasions.

In a twenty-third aspect, alone or in combination with one or more of the twenty-first aspect through the twenty-second aspect, the two corresponding RACH occasions are in a second slot.

In a twenty-fourth aspect, alone or in combination with one or more of the above aspects the apparatus is further configured to, prior to transmitting the first SSB transmission, establish a communication link with a node.

In a twenty-fifth aspect, alone or in combination with the twenty-fourth aspect, the communication link is established by the wireless communication device sending spatially separate SSBs.

In a twenty-sixth aspect, alone or in combination with one or more of the above aspects, the wireless communication device is configured to monitor a single beam.

Accordingly, a UE and a base station may perform enhanced SSB operations. By performing enhanced SSB operations, throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to spatially separate SSB may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 8 and 9) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   transmitting, by a wireless communication device, a first Synchronization Signal Block (SSB) transmission during a first slot; and
   transmitting, by the wireless communication device, a second SSB transmission during the first slot, the second SSB transmission the same as the first SSB transmission, wherein the first and the second SSB transmissions are transmitted using spatially separated beams, and wherein the first SSB transmission and the second SSB transmission are associated with a first corresponding Random Access Channel (RACH) occasion in a second slot.

2. The method of claim 1, further comprising monitoring at least the first corresponding RACH occasion associated with the first and the second SSB transmissions using corresponding spatially separated reception beams.

3. The method of claim 1, further comprising receiving, using a first reception beam, a first message on first RACH occasion resources from a second wireless communication device, the first RACH occasion resources associated with the first SSB transmission during the first corresponding RACH occasion.

4. The method of claim 3, further comprising receiving, using a second reception beam, a second message on second RACH occasion resources from a third wireless communication device, the second RACH occasion resources associated with the second SSB transmission during the first corresponding RACH occasion.

5. The method of claim 4, further comprising transmitting, to the third wireless communication device, data based on using a particular beam, wherein the particular beam corresponds to the second SSB transmission and the particular beam is associated with the first corresponding RACH occasion and the second message received using the second reception beam.

6. The method of claim 4, further comprising receiving, from the third wireless communication device, data based on using a particular reception beam, wherein the particular reception beam corresponds to the second SSB transmission and the particular reception beam is associated with the first corresponding RACH occasion and the second message received using the second reception beam.

7. The method of claim 1, wherein the first and second SSB transmissions have the same SSB ID.

8. The method of claim 1, wherein the first and second SSB transmissions are transmitted simultaneously, and wherein the first and second SSB transmissions are spatially separated.

9. The method of claim 1, wherein the first and second SSB transmissions have the same SSB index, the same digital signal, the same scrambling code, the same timing, the same frequency, or a combination thereof and are transmitted on the same resources.

10. The method of claim 1, further comprising transmitting, by the wireless communication device, a third SSB transmission during the first slot, and wherein the third SSB transmission has a second corresponding RACH occasion in the second slot.

11. The method of claim 1, wherein the first and second SSB transmissions are associated with a single corresponding RACH occasion that is the first corresponding RACH occasion.

12. The method of claim 1, wherein the first and second SSB transmissions share a corresponding RACH occasion in the second slot, and wherein the first and second slots are not sequential.

13. The method of claim 1, further comprising transmitting, by the wireless communication device, a third SSB transmission and a fourth SSB transmission during the first slot, and wherein the third SSB transmission and the fourth SSB transmission share a second corresponding RACH occasion in the second slot.

14. The method of claim 13, wherein the first and second slots are not sequential.

15. The method of claim 1, further comprising transmitting, by the wireless communication device, a third SSB transmission during the first slot, wherein the third SSB transmission has a second corresponding RACH occasion in a different slot.

16. The method of claim 1, wherein the first and second SSB transmissions have the same SSB index, the same digital signal, and the same scrambling code, and are transmitted on the same time-frequency resources.

17. The method of claim 1, wherein the first SSB transmission and the second SSB transmission are associated with a second corresponding RACH occasion in the second slot.

18. An apparatus configured for wireless communication, the apparatus comprising:
   means for transmitting a first Synchronization Signal Block (SSB) transmission during a first slot; and
   means for transmitting a second SSB transmission during the first slot, the second SSB transmission the same as the first SSB transmission, wherein the first and the second SSB transmissions are transmitted using spatially separated beams, and wherein the first SSB transmission and the second SSB transmission are associated with a first corresponding Random Access Channel (RACH) occasion in a second slot.

19. The apparatus of claim 18, wherein a network of the apparatus is configured for N number of SSBs and the apparatus is configured to use M number of SSB beams, and wherein M is greater than N.

20. The apparatus of claim 18, wherein the apparatus is configured to monitor multiple beams simultaneously, and further comprising:
   means for monitoring the first RACH occasion using a first beam; and
   means for monitoring the first RACH occasion using a second beam, the first RACH occasion corresponding to both the first and second SSB transmissions.

21. The apparatus of claim 18, wherein the first and second SSB transmissions are transmitted at least partially concurrently.

22. The apparatus of claim 21, further comprising:
   means for transmitting a third SSB transmission during the first slot, wherein the third SSB transmissions is also associated with the first corresponding RACH occasion in the second slot, and wherein the first, second, and third SSB transmissions have a second corresponding RACH occasion in the second slot.

23. The apparatus of claim 18, wherein the first and second SSB transmissions are associated with two corresponding RACH occasions including the first corresponding RACH occasion.

24. The apparatus of claim 23, wherein the two corresponding RACH occasions are consecutive RACH occasions.

25. The apparatus of claim 23, wherein the two corresponding RACH occasions are in the second slot.

26. A non-transitory computer-readable medium having program code recorded thereon, the program code comprising:

program code executable by a computer for causing the computer to transmit a first Synchronization Signal Block (SSB) transmission during a first slot; and program code executable by a computer for causing the computer to transmit a second SSB transmission during the first slot, the second SSB transmission the same as the first SSB transmission, wherein the first and the second SSB transmissions are transmitted using spatially separated beams, and wherein the first SSB transmission and the second SSB transmission are associated with a first corresponding Random Access Channel (RACH) occasion in a second slot.

27. The-transitory computer-readable medium of claim 26, further comprising, prior to transmitting the first SSB transmission, program code executable by a computer for causing the computer to establish a communication link with a node.

28. The-transitory computer-readable medium of claim 27, wherein the communication link is established by sending spatially separate third and fourth SSB transmissions.

29. An apparatus configured for wireless communication, the apparatus comprising:

at least one processor; and a memory coupled to the processor, the processor is configured:

to transmit a first Synchronization Signal Block (SSB) transmission during a first slot; and to transmit a second SSB transmission during the first slot, the second SSB transmission the same as the first SSB transmission, wherein the first and the second SSB transmissions are transmitted using spatially separated beams, and wherein the first SSB transmission and the second SSB transmission are associated with a first corresponding Random Access Channel (RACH) occasion in a second slot.

30. The apparatus of claim 29, wherein the apparatus is configured to monitor a single beam.

\* \* \* \* \*